(12) United States Patent
Narahari et al.

(10) Patent No.: US 9,626,760 B2
(45) Date of Patent: Apr. 18, 2017

(54) SYSTEM AND METHOD TO ALIGN AND MERGE DIFFERENTLY EXPOSED DIGITAL IMAGES TO CREATE A HDR (HIGH DYNAMIC RANGE) IMAGE

(71) Applicant: PathPartner Technology Consulting Pvt. Ltd., Bangalore (IN)

(72) Inventors: Narasimha Kaushik Narahari, Bengaluru (IN); Radhesh Bhat, Bengaluru (IN); Ragavan Vijaya, Bengaluru (IN); Akshay Panday, Bangalore (IN)

(73) Assignee: PathPartner Technology Consulting Pvt. Ltd. (IN)

( * ) Notice: Subject to any disclaimer, the term of this patent is extended or adjusted under 35 U.S.C. 154(b) by 38 days.

(21) Appl. No.: 14/627,502

(22) Filed: Feb. 20, 2015

(65) Prior Publication Data

US 2016/0125630 A1    May 5, 2016

(30) Foreign Application Priority Data

Oct. 30, 2014   (IN) .......................... 5415/CHE/2014

(51) Int. Cl.
```
G06T 7/00      (2006.01)
G06T 5/00      (2006.01)
G06T 11/60     (2006.01)
H04N 5/235     (2006.01)
G06T 5/50      (2006.01)
```

(52) U.S. Cl.
CPC ............ *G06T 7/0024* (2013.01); *G06T 5/003* (2013.01); *G06T 5/50* (2013.01); *G06T 7/003* (2013.01); *G06T 11/60* (2013.01); *H04N 5/235* (2013.01); *G06T 2207/10024* (2013.01); *G06T 2207/10144* (2013.01); *G06T 2207/20016* (2013.01); *G06T 2207/20208* (2013.01); *G06T 2207/20221* (2013.01)

(58) Field of Classification Search
CPC ....... G06T 11/60; G06T 5/003; G06T 7/0024; G06T 5/00; H04N 5/235
See application file for complete search history.

(56) References Cited

U.S. PATENT DOCUMENTS 8,346,009 B2 * 1/2013 Zhai ..................... G09G 3/2003
                                              382/274
8,606,042 B2   12/2013 Yadav
(Continued)

*Primary Examiner* — Utpal Shah
(74) *Attorney, Agent, or Firm* — Blueshift IP, LLC; Robert Plotkin, Esq.

(57) ABSTRACT

The present invention provides a system and method to align and merge differently exposed digital images to create a HDR image. In the present system, all the modules starting from the receiving module to fusion module are configured to produce a HDR image with better color purity and sharpness. Each captured image in the system is configured to operate in the HSI color space. The alignment module is configured to align the pixels of each image in a pyramid shaped resolution structure to derive alignment vectors for one or more regional partitions of each image across one or more levels of the pyramid. The system is configured such that, the saturation component in the HSI color space is used to pick the color purity of pixels and intensity channel is used to weigh the sharpness of pixels of each of the differently exposed captured images.

6 Claims, 4 Drawing Sheets

(56) References Cited

U.S. PATENT DOCUMENTS

| | | | | |
|---|---|---|---|---|
| 8,830,360 B1* | 9/2014 | Burt | ......................... | H04N 5/21 |
| | | | | 348/241 |
| 8,885,976 B1* | 11/2014 | Kuo | ....................... | H04N 5/211 |
| | | | | 382/103 |
| 2008/0317338 A1* | 12/2008 | Shirai | ...................... | H04N 1/62 |
| | | | | 382/167 |
| 2009/0185358 A1* | 7/2009 | Liu | ......................... | G03B 15/02 |
| | | | | 362/3 |
| 2010/0232726 A1* | 9/2010 | Liu | ...................... | H04N 1/4072 |
| | | | | 382/274 |
| 2011/0074957 A1* | 3/2011 | Kiyohara | ............... | G06K 9/342 |
| | | | | 348/148 |
| 2011/0254976 A1* | 10/2011 | Garten | .................. | G06F 3/1454 |
| | | | | 348/229.1 |
| 2013/0114894 A1* | 5/2013 | Yadav | ..................... | G06K 9/40 |
| | | | | 382/167 |
| 2013/0335596 A1* | 12/2013 | Demandolx | ......... | H04N 5/2354 |
| | | | | 348/231.99 |
| 2014/0072179 A1* | 3/2014 | Sasaki | ................... | G06T 7/2013 |
| | | | | 382/107 |
| 2015/0030242 A1* | 1/2015 | Shen | ......................... | G06T 5/50 |
| | | | | 382/165 |
| 2015/0078661 A1* | 3/2015 | Granados | ................ | G06T 5/009 |
| | | | | 382/167 |
| 2015/0170389 A1* | 6/2015 | Ming | ................. | G06K 9/00684 |
| | | | | 382/284 |
| 2015/0201118 A1* | 7/2015 | Lee | ...................... | H04N 5/2355 |
| | | | | 348/222.1 |
| 2016/0093029 A1* | 3/2016 | Micovic | .................. | G06T 5/009 |
| | | | | 348/229.1 |
| 2016/0142649 A1* | 5/2016 | Yim | ................... | H04N 5/23229 |
| | | | | 348/239 |

\* cited by examiner

| Original alignment (ms) | Checkerboard pattern block based alignment(ms) | Savings in time (ms) |
|---|---|---|
| 1161.4 | 655.6 | 505.8 |

FIGURE 3

| Image set | Alignment vector obtained by processing all pixels (x,y) | | Checkerboard -block based (x,y) | |
|---|---|---|---|---|
| Close Range - ambient lighting | (4,0) | (5,1) | (4,0) | (5,1) |
| Wide distance range | (4,-2) | (22,-4) | (3,-1) | (24,-4) |
| High saturation regions | (5,1) | (-2,-4) | (5,1) | (-2,-4) |
| Outdoor -sky | (-5,-13) | (-8,-13) | (-6,-13) | (-7,-13) |
| High dynamic range -possible blurring | (3,10) | (20,17) | (3,10) | (20,16) |
| High Dynamic Range -contoured | (-4,5) | (3,-1) | (-5,4) | (3,-1) |

FIGURE 4

SYSTEM AND METHOD TO ALIGN AND MERGE DIFFERENTLY EXPOSED DIGITAL IMAGES TO CREATE A HDR (HIGH DYNAMIC RANGE) IMAGE

DESCRIPTION OF THE INVENTION

The following specification particularly describes the invention and the manner in which it is to be performed:

TECHNICAL FIELD OF THE INVENTION

The present invention relates to a system and method to align and merge differently exposed digital images to provide a HDR image.

BACKGROUND OF THE INVENTION

Generally, an embedded camera includes an imaging sensor to convert optical signals into electrical signals. Most embedded cameras are equipped with an auto exposure control. The auto exposure control measures the average light intensity of the image scene being photographed, and determines an appropriate exposure value for photographic capture. The dynamic range of the embedded camera's imaging sensor is the ratio of the highest to the lowest light intensity that can be recorded by it. Image sensors have limited dynamic range. The dynamic range of a typical image sensor is often many orders of magnitude less than the dynamic range of natural scenes comprising regions of varying radiances. As a result of this, a single image can capture only a small fraction of the light intensities and colour vividness of the scene.

An image captured with high exposure time represents the darker areas of the scene well, whereas an image at low exposure time captures the brighter scene regions better. Computational High Dynamic Range (HDR) photography and exposure bracket image compositing techniques capture the images of the scene at different exposures and fuse the visual information from all of them into one single image.

Various types of conventional HDR techniques are known in the prior art, wherein most of them use a Red-Green-Blue (RGB) colour space technique for image processing. For example, U.S. Pat. No. 8,606,042 describes a system and method for blending of exposure-bracketed images using weight distribution functions. This system and method is presented for generating a new digital output image by blending a plurality of digital input images capturing the same scene at different levels of exposure. Each new pixel for the new digital output image is derived from a group of corresponding aligned pixels from the digital input images. In order to determine weight for each pixel, in each group of mutually-aligned source-image pixels, a weight distribution function is applied to values of an image characteristic for the pixels in the group of corresponding aligned pixels, and a net weight is subsequently assigned to each of the pixels in the group. Pixel values of pixels in each group of mutually-aligned source-image pixels are modified based on the net weights assigned to the pixels in order to obtain a new pixel value for a corresponding new pixel in the new digital output image. The claimed system inputs images in RGB colour space followed by conversion to HSV/HSI (Hue, Saturation, and Value/Intensity) colour space for processing the digital image to evaluate image characteristics such as pixel luminance, colour saturation, contrast, image intensity and sharpness. However, the use of RGB colour space in the claimed system requires to access to and processing of all three components, i.e. red, green and blue values for each pixel to provide saturation and contrast (sharpness indicator) for each digital image. This leads to huge computational overhead and memory access penalty, especially on embedded platforms. The YUV colour space could be considered a candidate for the operations just described; it does have the advantage of the intensity channel being naturally available, resulting in identical speed up with respect to alignment and sharpness measurement. However, the colour purity measure is not naturally available and its derivation would be convoluted and time intensive, thus ruling out usage of the YUV colour space.

In conventional systems, fusion of differently exposed images derives three weights such as saturation, contrast and well-exposedness to indicate the colour purity, sharpness and intensity balance and fuses images based on these weights. The weighted pixel addition is performed at different scales of the resolution pyramid. Pyramiding is the representation of a digital image at different scales to ensure visual homogeneity when pixels from differently illuminated images are used to composite into a single image, either directly or after quality weighting. The digital image pyramids are sent to the alignment process. Typically, the system in the alignment process thresholds and aligns the differently exposed images around their statistical medians to negate or nullify the effect of the exposure difference. Further, the alignment process calculates the shift or misalignment with respect to the each pixels of reference image, of all scales in the digital image of each exposure in the pyramid pattern. However, the process in the conventional system fails to exploit the redundancy existent in the pyramid pattern due to the misalignment of all pixels. This misalignment of all pixels is due to the global motion. This leads to increased computational time for the alignment process especially when operating at highest pyramid resolution in a hand held device with limited processing power.

Conventional system gauges the saturation, i.e. colour purity of an image by computing the standard deviation across the red, green and blue components. However, such calculation of saturation may not result in pleasing colours in the fused image. The fused image in any other colour space does not lend itself optimally to provide post-processing operations such as colour enrichment, sharpening and colour modification.

Hence, there is need for a system and method of generating a perceptibly improved HDR image much faster, and with lesser memory.

SUMMARY OF THE INVENTION

The present invention overcomes the drawbacks in the prior art and provides a system and method to align and merge the differently exposed digital images to create a HDR image. In most preferred embodiment, the system comprises of embedded camera to trigger capturing of plurality of digital images of a scene in auto-exposure mode and with varying exposure biases. Each digital image includes one or more pixel arrays. The embedded camera comprises of a receiving module, an image restructuring module, an alignment module, a weight map computation module, a motion compensation module and a fusion module. The receiving module is configured to receive the bracket of differently exposed images. The image restructuring module is configured to convert the received images to the hue-saturation-intensity (HSI) colour space and construct a resolution scaled pyramid for the intensity channel of each captured image. The image restructuring module also converts back the resultant image after fusion, or after post-processing subsequent to fusion; into a color space/format suitable for rendering on displays or encoding. The alignment module is configured to align the pixels of the intensity channel of each image to derive alignment vectors for one or more regional or global partitions of each image, across one or more levels of the pyramid. The obtained alignment vectors are used to shift/align the hue and saturation channels of the images as well. The weight map computation module is configured to weigh and qualify the pixels of the image from the alignment module to take into account colour purity and sharpness. The motion compensation module is configured to detect and compensate artifacts in the qualified pixels due to scene subject motion. The fusion module is configured to merge the differently exposed qualified pixels from the motion compensation module to result in the HDR image.

In a preferred embodiment of the invention, the alignment module operates by performing the shift calculation operation for each pixel, for pyramidal image resolutions which are one or more below the highest; and at the highest and one or more levels below the highest, only half the number of pixels are processed in a logical pattern. This is because the global nature of the misalignment of the pixels is exploited ensuring all pixels need not be processed.

In a preferred embodiment of the invention, the motion compensation module detects and compensates artifacts in the qualified pixels by comparing with the digital image designated as reference.

According to another embodiment of the invention, the invention provides a method to align and merge the differently exposed digital images to create a HDR image, wherein the method includes the step of receiving a bracket of exposure biased digital input images of a scene from an embedded camera. The digital input images include one or more pixel arrays. After receiving the captured images, the digital images are converted into a HSI colour space. In the next step, a pyramid shaped resolution structure is constructed for each intensity channel of each HSI image; this image structure being initially used for alignment. In the next step, the pixels of the captured images are qualified for colour purity (using the saturation: 'S' channel) and sharpness (using the intensity 'I' channel). After this, the artifacts in the qualified pixels due to scene motion are detected and compensated by comparing qualified pixels with the image designated as reference. Finally, the differently exposed qualified pixels are fused to represent a HDR image. The HDR image, which is in the HSI colour space, is converted into another colour space suitable for rendering/encoding.

The invented system eliminates the use of other colour spaces for calculating the weights and pixel operations of the digital images. The use of color the RGB colour space consumes more time and needs huge memory for processing pixel operations. The invented system uses the intensity ('I') channel of the HSI colour for the grayscale/intensity operations of alignment and contrast qualification. Though the intensity channel is readily available in the YUV color space (the 'Y' component corresponding to intensity), the saturation or the color purity component is not available and its derivation would be complex and time intensive. Thus, YUV color space does not qualify for implementation in the pipeline.

In the invented system, HSI colour space is used in the fusion process to derive metrics of colour purity (from the saturation channel) and image sharpness (from the intensity channel) naturally, which results in computational savings with respect to memory access and storage. In this pipeline, the colour saturation is calculated using the equation used for converting to the HSI colour space used during weight map computation, resulting in rich vibrant colours in the fused image. The entire pipeline operates in HSI colour space which avoids the back and forth conversion between other colour spaces within the processing pipeline.

It is to be understood that both the foregoing general description and the following details description are exemplary and explanatory and are intended to provide further explanation of the invention as claimed.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

FIG. 3 illustrates the time consumption analysis for aligning the digital images when pixels are operated in typical checkerboard pattern, the generic version of which is being elaborated upon in this patent; according to one embodiment of the invention.

FIG. 4 illustrates the comparison of the alignment vectors generated between the existing techniques and the checkerboard pattern technique, according to one embodiment of the invention.

DETAILED DESCRIPTION OF THE INVENTION

Reference will now be made in detail to the description of the present subject matter, one or more examples of which are shown in figures. Each embodiment is provided to explain the subject matter and not a limitation. These embodiments are described in sufficient detail to enable a person skilled in the art to practice the invention, and it is to be understood that other embodiments may be utilized and that logical, physical, and other changes may be made within the scope of the embodiments. The following detailed description is, therefore, not be taken as limiting the scope of the invention, but instead the invention is to be defined by the appended claims.

The term 'HSI colour space' as claimed in the embodiments herein, refers to representation of the colour in terms of physical attributes that separate the achromatic component from the chromatic one and yields a more analytic description of the colors.

The present invention provides a system and method to align and merge differently exposed digital images to create a HDR (High Dynamic Range) image. The system includes an embedded camera, wherein the camera comprises of a receiving module, an image restructuring module, an alignment module, a weight map computation module, a motion compensation module and a fusion module. All the modules starting from the receiving module to fusion module are configured to produce a HDR image with increased colour purity and sharpness compared to current art. In the system, each captured image is configured to operate in the HSI colour space. The system is further configured such that, the saturation component in the HSI colour space is used to weigh pixels based on colour purity and the intensity component is used to derive the sharpness measure for each of the differently exposed captured images.

The invented system eliminates the use of other colour spaces for calculating the weights and pixel operations of the digital images. The use of other colour spaces consumes more time and huge memory for the pixel processing operations. The use of HSI colour space with alignment process saves time and memory for pixel operations of the digital images.

In the invented system, the used HSI colour space with the fusion process merge the differently exposed images to measure the metrics of colour purity and image intensity or sharpness. In this pipeline, the colour saturation is calculated using the equation used for converting to the HSI colour space used in weight map computation, resulting in rich vibrant colors in the fused image. The entire pipeline operates in HSI colour space which avoids the back and forth conversion between other colors spaces within the pipeline processing.

The invented system is cost effective, easy to use and simple. The invented system especially benefits applications in embedded cameras.

Figure 1:
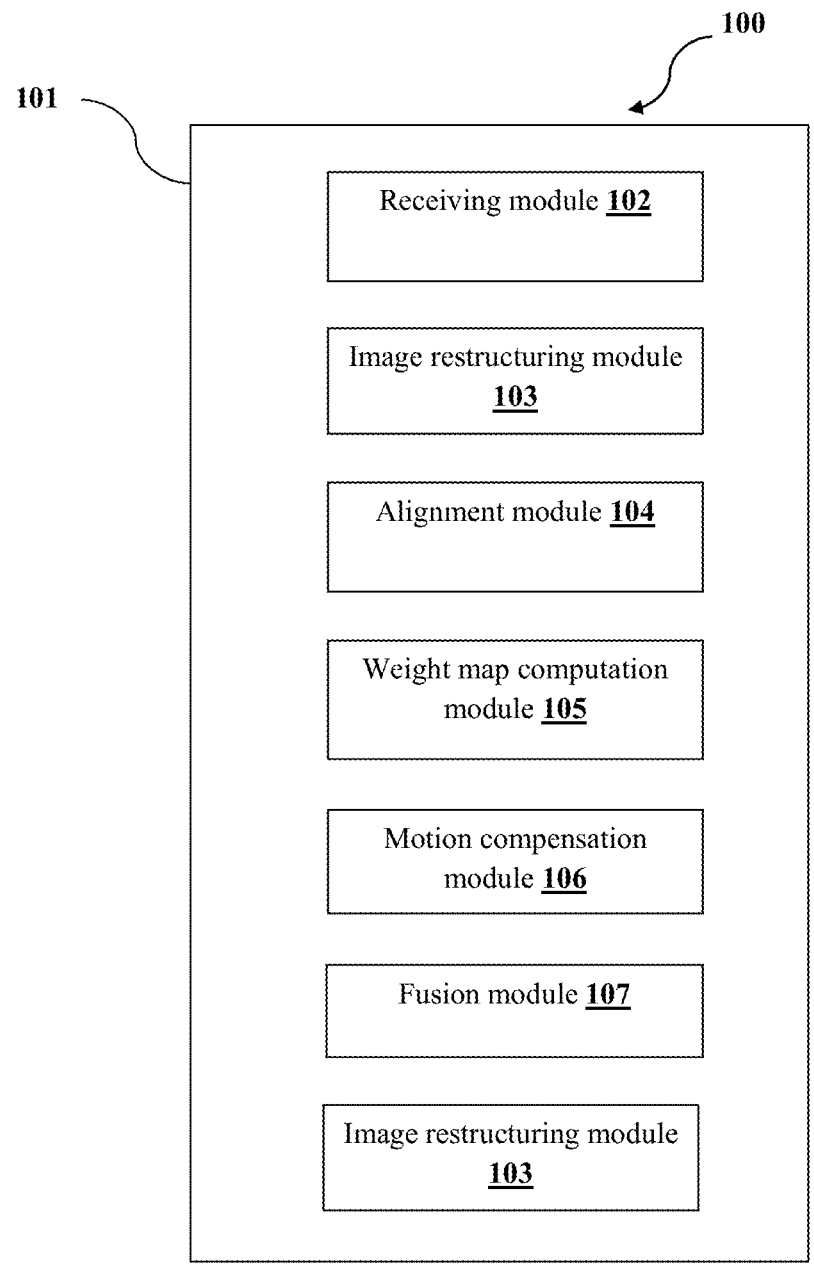
FIG. 1 illustrates a block diagram of the system to align and merge the differently exposed digital images to create a HDR image, according to one embodiment of the invention.

FIG. 1 illustrates a block diagram of the system to align and merge differently exposed digital images to create a HDR image, according to one embodiment of the invention. The system 100 comprises of an embedded camera 101. The embedded camera 101 further comprises of a receiving module 102, an image restructuring module 103, an alignment module 104, a weight map computation module 105, a motion compensation module 106 and a fusion module 107. The embedded camera 101 captures a plurality of digital images of a scene. The digital image includes one or more pixel arrays. The digital images of the scene are captured as a bracket of differing exposures. The receiving module 102 is configured to receive the captured digital images. The image restructuring module 103 is configured to convert the received images to HSI colour space and construct a pyramid shaped resolution structure for intensity channel of each captured image. The pyramid shaped resolution structure includes one or more levels to process the pixel operations. The image restructuring module 103 also converts the resultant image in HSI color space into a color space suitable for encoding/rendering on standard displays after fusion. The alignment module (104) is configured to align the pixels in the pyramid for each image. The pixels of each image are arranged in a pattern to derive alignment vectors for one or more regional partitions of each image. The alignment vectors of the pixels of each image are obtained by comparing with the pixels of the digital image designated as the reference. This alignment operation in any particular pattern is performed only at one or more of the highest levels of the pyramid resolution structure. In the preferred embodiment, the alignment module 104 is configured to calculate the alignment shift computation in the pixels and exploit the redundancy of the pixels in global motion.

The shift computation in the alignment module 104 is derived based on partition of the pixels of each image in a chosen pattern. The claimed invention calculates the shift in pixels due to hand motion for all pixels across the lower levels of the pyramid except for one or more highest levels.

At these one or more of the highest pyramid levels, we split each level into sections along each dimension; thus resulting in logical processing blocks. The shift computation is derived based on only in the calculation in the blocks according to the pattern. The best shift for the corresponding level is obtained when minimal error is obtained after bit map operations among neighboring 9 pixel shifts including the co-located one. Since the no. of pixels is halved due to preferred pattern, a scaling factor is multiplied by the error and then passed to decision logic to arrive at the best shift. Typically the scaling factor (SF) of 2 can be used. The final vertical and horizontal shifts obtained, indicate the misalignment due to hand motion. It is salient to observe that alignment precision is not compromised by calculating shifts only in the alternate blocks as; the shifts computed in the corresponding blocks of lower levels is reliably propagated. It is also important to note that since the hand motion introduced misalignment affects all pixels, the shift calculated by the processed blocks is sufficient. It is directly observable that the number of pixels processed is halved for the one or more of the highest resolutions, for each exposure; resulting in large time savings.

In preferred embodiment, the weight map computation module 105 is configured to weigh and qualify the pixels of each captured image from the alignment module. This weight map computation in each captured image is performed to take into account the colour purity and image sharpness.

The motion compensation module 106 is configured to detect and compensate artifacts in the qualified pixels due to scene subject motion which are received from the weight computation module. The motion compensation module 106 detects and compensates artifacts in the qualified pixels by comparing with the reference digital image. The fusion module 107 is configured to merge the differently exposed qualified pixels from the motion compensation module to represent a High Dynamic range (HDR) image.

The entire pipeline, right from the receiving module 102 to the fusion module 107 of the each captured image optimally operates in the HSI colour space. The saturation component in the HSI colour space is used to pick colour pure pixels from each of the differently exposed captured images and the intensity component is used to pick the sharp pixels.

Figure 2:
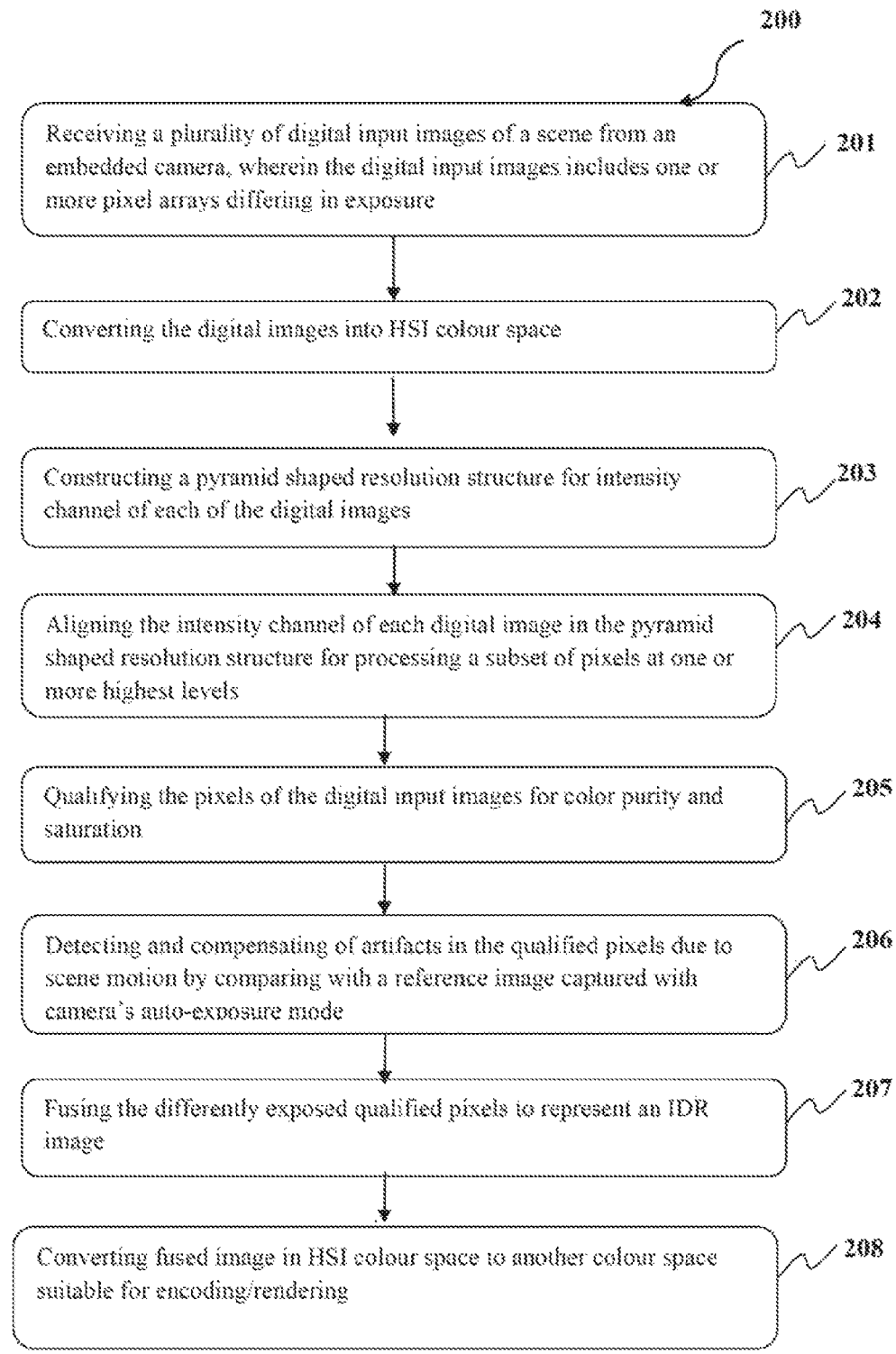
FIG. 2 illustrates a method for aligning and merging differently exposed digital images to create a HDR image, according to one embodiment of the invention.

FIG. 2 illustrates a method for aligning and merging differently exposed digital images to create a HDR image, according to one embodiment of the invention. The method 200 comprises the steps of, receiving a plurality of digital input images of a scene from an embedded camera at step 201. The digital input images include one or more pixel arrays. After receiving the captured digital images, at step 202, the intensity channel of each digital image is captured from the HSI colour space. At step 203, a pyramid shaped resolution structure is constructed for each intensity channel of the digital image. At step 204, the HSI images are aligned in the pyramid shaped resolution structure with intensity channel for processing a subset of pixels at one or more highest levels. At step 205, the pixels of the input images for colour purity and saturation are qualified for each captured image. After qualifying the pixels, at step 206, artifacts in the qualified pixels due to scene motion are detected and compensated by comparing qualified pixels with a reference image captured with camera's auto-exposure mode. Finally, at step 207, the differently exposed qualified pixels are fused to represent a HDR image. Then, at step (207), the fused image in the HIS colour space is converted to another colour space suitable for encoding/rendering.

FIG. 3 illustrates the time consumption analysis for aligning the digital images in the checkerboard pattern, according to one embodiment of the invention. The profiling was done on Google Nexus 5 smart phone, at the highest sensor resolution of 8 MP (3264×2448 pixels). The reported results were the result of average across ten runs. The times mentioned were all in milliseconds. It is clearly observable that, there is large computational saving in time for processing the pixel operations using the checkerboard pattern process; checkerboard is one of the possible patterns of the general pattern embodiment elaborated upon in this patent.

FIG. 4 illustrates the comparison of the alignment vectors generated between the existing techniques for alignment which process all pixels for all images across the pyramid, and the checkerboard pattern technique implemented for the two highest levels. The alignment vectors are presented as (x, y) coordinates. The first set of coordinates indicates the alignment vector for the high exposure image and the second set indicates the alignment vector for the low exposure image. The alignment vectors are obtained for image resolution of 8MP (3264×2448 pixels).

Figure 5:
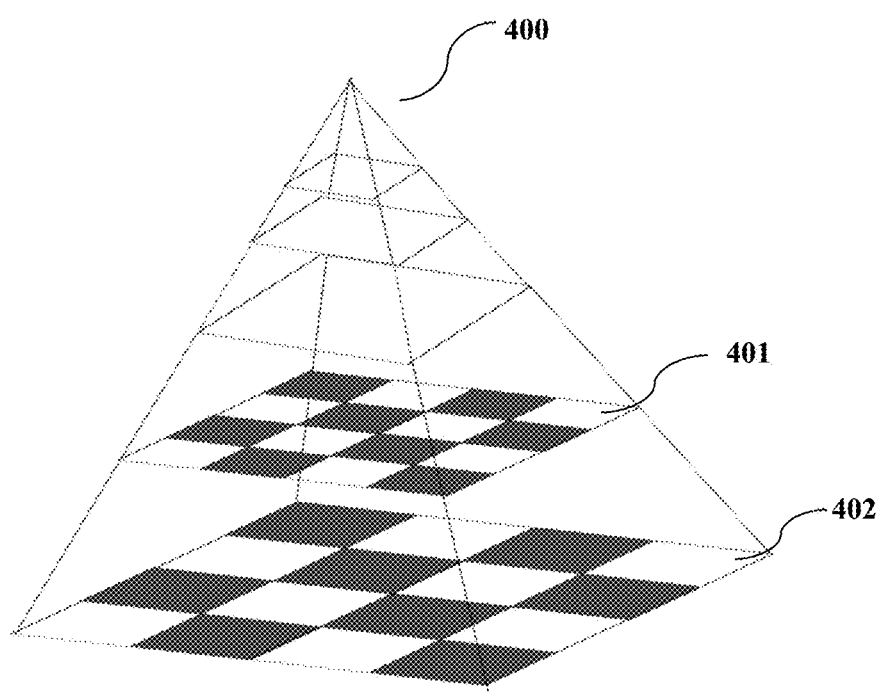
FIG. 5 shows the overall pyramid shape resolution structure used in image alignment, according to one embodiment of the invention.

FIG. 5 shows the overall pyramid shape resolution structure used in image alignment, according to one embodiment of the invention. This is a specific illustration of the generic embodiment discussed in the patent, with the alignment optimization effected on the two highest levels of the pyramid and in a pattern that resembles a checkerboard. Out of total levels N, first N−2 levels from lowest resolution undergoes all pixel error calculation to arrive at translational vector, whereas the two highest levels 401 and 402 undergo checkerboard based processing. The size of each of the blocks in checkerboard is W/4*H/4, W and H represents width and height in corresponding level respectively. At the highest 402 and the penultimate 401 levels, the pixels in each captured image are arranged in 4 sections along each dimension; thus resulting in 16 blocks of size dimensions i.e. width/4 and height/4 each. The pixel operation of each image is done in highest 402 and the penultimate 401 levels of the pyramid 400.

The invented system eliminates the use of colour spaces other than the Hue, Saturation, Intensity (HSI) colour space for calculating the weights and pixel operations of the digital images. The use of other colour spaces consumes more time and huge memory for processing pixel operations. The invented system uses only the HSI colour space for the alignment, pixel qualification, motion artifact removal and fusion processes. The use of HSI colour space saves time and memory for pixel operations of the digital images. The present invention doesn't require buffers which store redundant image data such as the Red, Green and Blue buffers in the Red-Green-Blue (RGB) color space; concurrent with saturation and/or intensity information. For example, consider a single 8Mega Pixels (MP) image of 3264 pixels wide and 2448 pixels wide. Size of the extracted R, G, B image components=3264*2448*3~=22.86 Mega Bytes (MB). This memory is held through the images fusion process. During the fusion, the intensity and saturation components are computed. When they are computed sequentially (trading off time for memory), the buffer required for each image is: 3264*2448~=7.62 MB. This additional memory buffer is redundant in the sense that it stores the information essentially contained in the R, G, B components. In the case of HSI color space, the intensity and saturation information is readily available in the channels and thus the overhead is avoided. The present invention also facilitates time savings. The time is saved as the color space conversion is done exactly twice, i.e. in at the start and at the finish. The color space conversion is well optimized and even accelerated in specific embedded hardware. This is more optimized than computing the individual channels in between.

In the invented system, the use HSI colour space with the fusion process merge the differently exposed images to provide the metrics of colour purity and image intensity or sharpness which results in computational savings with respect to memory access and storage. In this pipeline, the colour saturation is calculated using the equation used for converting to the HSI colour space which results in rich vibrant colors in the fused image. The entire pipeline operates in HSI colour space which avoids the back and forth conversion between other colors spaces within the pipeline processing.

The invented system is cost effective, ease to use and simple. The invented system is more suitable for applications in embedded cameras.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

We claim:

1. A system to align and merge a plurality of differently exposed digital images to create a HDR image, the system comprising:
    a. an embedded camera to capture a bracket of differently exposed digital images, wherein each digital image includes one or more pixel arrays;
        wherein the embedded camera comprises:
            i. a receiving module configured to receive the bracket of differently exposed digital images;
            ii. an image restructuring module configured to convert the received images to hue-saturation-intensity (HSI) color space and construct a pyramid shaped resolution structure for intensity channel of each captured image;
            iii. an alignment module configured to align each pixel of the one or more pixel arrays of each image in the pyramid shaped resolution structure of the intensity channel to derive alignment vectors for one or more regional partitions of each image across one or more levels of the pyramid shaped resolution structure, subsequently effecting a computed alignment vector on a hue and saturation channels;
            iv. a weight map computation module configured to weigh and qualify the pixels of the image from the alignment module to take into account colour purity and sharpness;
            v. a motion compensation module configured to detect and compensate artifacts in the qualified pixels due to scene subject motion;
            vi. a fusion module configured to merge the qualified pixels of the bracket of differently exposed digital images from the motion compensation module to represent a High Dynamic range (HDR) image; and
            vii. the image restructuring module further converts the HDR image in HSI color space into another color space suitable for rendering/encoding.

2. The system as claimed in claim 1, wherein image characteristics of colour purity and sharpness are weighted to generate the HDR image.

3. The system as claimed in claim 1, wherein the alignment module is further configured for calculating an alignment shift computation in the pixels and exploiting redundancy in the pixels due to global motion, wherein the alignment shift computation based on partition of the pixels of each image of the bracket of differently exposed digital images in a chosen pattern.

4. The system as claimed in claim 1, wherein the alignment module derives alignment vector at one or more highest [in case of the two highest levels] levels of the pyramid shaped resolution structure.

5. The system as claimed in claim 1, wherein all the processing steps from the alignment module to the fusion module executed in Hue Saturation Intensity (HSI) color space.

6. A method to align and merge a plurality of digital input images, wherein the method comprising the steps of:

a. receiving the plurality of digital input images of a scene, of different exposures, from an embedded camera; wherein the digital input images includes one or more pixel arrays;
b. converting the digital input images a HSI color space;
c. constructing a pyramid shaped resolution structure for the intensity channel of each HSI image;
d. aligning the HSI images through the pyramid shaped resolution structure with intensity channel for processing a subset of pixels at one or more highest levels;
e. qualifying the pixels of the digital input images for colour purity and sharpness;
f. fusing the qualified pixels of the digital input images to represent a HDR image; and
g. converting the HDR image in HSI colour space to another colour space suitable for encoding or rendering.

* * * * *